United States Patent Office 3,551,125
Patented Dec. 29, 1970

3,551,125
METHOD OF FORMING A GRINDING WHEEL
Raymond T. Hallewell, Hillingdon Heath, England, assignor to Toolmasters Limited, Hillingdon Heath, England
No Drawing. Filed Jan. 4, 1968, Ser. No. 695,561
Claims priority, application Great Britain, Jan. 4, 1967, 587/67
The portion of the term of the patent subsequent to Dec. 10, 1985, has been disclaimed
Int. Cl. B24d 1/04; C08g 5/06
U.S. Cl. 51—293      10 Claims

ABSTRACT OF THE DISCLOSURE

A method of making a grinding member having a profiled grinding surface, the grinding member having a base a kneadable composition on the base comprising a hardenable synthetic resin. An abrasive is deposited on the exposed surface of the composition when still in a plastic state, the surface of the grinding member then being rolled to the required predetermined profile while simultaneously causing embedding of the abrasive into the composition.

---

This invention relates to the production of grinding members and provides a method of making a grinding member having a profiled grinding surface comprising forming a body of a kneadable composition comprising a hardenable synthetic resin having a filler dispersed therethrough, and, whilst the composition is still in a plastic state, embedding an abrasive in an exposed surface of the body and simultaneously rolling the said surface to the required predetermined profile with a master roller, the profiled body thereafter being hardened with substantially no volume change.

For the production of a grinding wheel, a layer of the composition may be applied around the rim of a supporting disc and then treated as described above. The rim of the disc or base may be preformed to the required profile before the application of the composition, but is preferably flat and roughened, as by scoring or pitting, to provide a key for the kneadable composition.

Due to the workable nature of the plastic composition, the method of the invention does not require the application of high pressure for the profiling or impregnation, so that power consumption is relatively low, there is little or no wastage of abrasive, and there is no limitation as to the width of the discs that can be treated. The invention thus provides a method whereby cheaper and more accurately profiled grinding members with a wider range of possible profiles can be produced than has been possible heretofore. In the production of grinding wheels the method of the invention has the additional advantage that it can be operated without affecting the true running of the finished wheel; the wheel can be mounted, trued up, and then profiled and impregnated in position and ready for use.

The abrasive and filler employed will normally be different materials, but the abrasive may in some cases also be the filler or dispersed through the composition with a different filler.

The filler imparts bulk to the composition, aids in the production of the required kneadable consistency for rolling, and imparts strength and rigidity to the hardened product. Any one or more of a wide variety of fillers may be employed according to the physical properties required of the product.

Various comminute metals can for example be employed as fillers. Hard metals such as steel give a product which retains its accuracy of profile over long periods, whereas softer metals such as copper or aluminium have the advantage of wearing in use to continually expose fresh abrasive; these softer metals, giving a soft wearing bond, are employed for fine work or for fast removal of stock without risk of damage to the work.

The following table illustrates properties typically required of grinding wheels for particular purposes together with examples of appropriate fillers for use in the method according to the invention.

| Characteristic of hardened composition | Advantage or suited use of grinding member | Examples of appropriate fillers |
| --- | --- | --- |
| Soft wearing bond | (a) for fine work; (b) for fast stock removal without damage to work. | Soft metals such as copper or aluminium; soft nonmetals such wood flour, chalk powder, marble flour. |
| Hard wearing bond | Minimum wheel wear. | Slate powder; silica flour; hard metals such as steels. |
| Very hard, abrasive-wear resisting bond | Minimum wheel wear. | Aluminium oxide, silicon carbide. |
| Shock resistance | Where high resilience is required in hard working wheels. | Nylon; asbestos powder. |
| Electrical conductivity | For electrolytic grinding | Electrically conductive metals such as copper and aluminium; electrically conductive nonmetals such as graphite; nonmetals and plastics materials coated with electrically conductive metal. |
| Thermal conductivity | Minimum damage to work through local overheating during grinding. | Thermally conductive metals such as copper or aluminium. |
| Heat-resistant bond | Minimum damage to wheel due to local overheating during grinding. | Heat-resistance materials such as mica or asbestos powder. |

The fillers mentioned above can be used alone, but where a combination of properties is required of the finished grinding member a mixture of different fillers may be employed. The particular filler or fillers used, and the proportion or proportions thereof employed, is selected according to the use to which the grinding member is to be put.

Where a comminuted metal or mixture of metals is employed alone as the filler, the metallic component will normally constitute a major proportion by weight of the kneadable composition, but where as mixture of metal with another filler (i.e., an abrasive such as diamond, alumina or silicon carbide, or a filler imparting shock- or heat resistance) is employed, the metallic component may constitute only a minor proportion by weight of the composition.

As indicated above the total proportion of filler employed in the composition may vary over a wide range according to the intended purpose of the product. In general however, the proportions will range from 60% by volume of filler, 40% by volume of resin if no abrasive is present to 40% by volume of filler, 60% by volume of resinous component where abrasive is present.

The identity, amount, and grain size of the abrasive applied to the exposed surface of the grinding wheel will also be chosen according to the intended use of the finished grinding member, as is well understood in the art. For example, diamond used as the applied abrasive will normally be of from 80 to 200 grit size, the finer particles being used for accurate work and the coarser for rough grinding.

The abrasive particles may be simply sprinkled onto the surface of the composition, but are preferably sprayed on, e.g., in an air jet. In the production of a grinding wheel the abrasive may for example be sprayed onto the peripheral layer, during profiling, from a spray head which is most advantageously mounted in place of the usual forming tool on a standard wheel-forming apparatus such as the Diaform equipment described in British patent specification No. 573,877.

The advantage of mounting the spray jet on a Diaform is that the jet is kept at a constant distance from the face of the wheel; this is important, as any variation in this distance will vary the concentration of the abrasive applied, due to spread as the abrasive leaves the jet.

With the spray method using a predetermined pressure and distance, the penetration and concentration of abrasive applied to the wheel can be controlled; the penetration need only be deep enough to key the abrasive, as it will be immediately rolled into position.

Simultaneous forming and impregnation with abrasive is advantageous, because the optimum consistency of the hardening composition for both the rolling and the impregnation steps is the same; if application of abrasive is delayed until the composition has hardened further, the abrasive is likely to be loosely bounded and may pull out of the wheel during grinding.

The plastic composition should be of such consistency for the profiling and impregnating step that it does not stick to the roller. The resin and the hardening agent used in the composition are therefore preferably so selected that the prepared composition retains its workable consistency for an extended period, e.g., for an hour or more.

To obtain the optimum workable consistency it may be necessary to include a thickening agent, such as silica, in the composition. Polymerisable epoxy or polyester resins, in admixture with a hardening agent, e.g., one comprising a polyamide and a mild base such as an amine, are suitable for use as the resinous component of the composition. Acrylic resins with appropriate hardening agents are also suitable as the resinous component of the composition.

As indicated above abrasive particles may be employed as the filler, or as part of the filler, and this permits wheels to be produced having layers with abrasives of different grain size. For example the kneadable composition may be wholly or partially filled with abrasive of relatively coarse grain size, a finer abrasive (which may be the same as or different from the coarse abrasive) being applied superficially during profiling. Initially, when the form of this wheel is most accurate, fine grit is exposed and the wheel can hence be used for finish grinding; as the form wears, coarse abrasive is exposed rendering the wheel more suited for rough grinding.

Embodiments of the invention are illustrated by the following specific examples.

EXAMPLE 1

A metal disc of about 6" diameter, about 1" thick and having a roughened rim is mounted on the spindle of a grinding machine. A thin layer of Devcon "A" (trademark) a resinous composition including 80% by weight comminuted steel and 20% by weight curable epoxy resin, is applied around the rim of the disc and allowed to partially harden. The required form is then rolled into the peripheral layer of Devcon "A" by means of a master roller, whilst diamond dust is sprayed onto the layer immediately ahead of the roller from a spray head mounted in place of the forming tool on a wheel-forming apparatus. The profiled and impregnated layer of Devcon "A" is then allowed to set to its final hardness. The Devcon "A" sets to a hard mass with substantially no shrinkage, so that a hard-wearing abrasive surface of accurate profile is obtained.

EXAMPLE 2

The procedure of Example 1 was repeated using Devcon "F" instead of Devcon "A". Devcon "F" includes 80% by weight of comminuted aluminium as filler. A soft-wearing thermally-conductive wheel of accurate profile was obtained.

EXAMPLE 3

The procedure of Example 1 was repeated using as the kneadable composition a curable epoxy resin containing 80 wt. percent of copper as filler. An electrically conductive wheel of accurate profile, suitable for electrolytic grinding was obtained.

EXAMPLE 4

The procedure of Example 1 was repeated employing a kneadable composition containing 15 wt. percent epoxy resin, 40 wt. percent comminuted aluminium, and 45 wt. percent 80-grit-size diamond dust, the diamond dust applied superficially being of 200-grit-size. The wheel obtained was a relatively soft-wearing thermally conductive wheel having an accurate profile with fine abrasive exposed. The wheel is initially suited for fine work, but as it wears coarser abrasive is exposed for rough grinding with fast stock removal.

EXAMPLE 5

The procedure of Example 1 was repeated using a composition in which 40 wt. percent of the steel was replaced by granulated nylon, a hard-wearing shock-resistant wheel being obtained.

EXAMPLE 6

The procedure of Example 1 was repeated using a kneadable composition of a curable polyester resin containing as filler 60% by volume of a 50/50 mixture of wood flour and marble flour, a very soft-wearing wheel for fast stock removal being obtained.

EXAMPLE 7

The procedure of Example 1 was repeated using a kneadable composition of a curable polyester resin containing as filler 30% by volume of asbestos powder and 30% by volume of silicon carbide, the wheel obtained being very hard, wear-resistant, shock-resistant and heat-resistant.

EXAMPLE 8

A wheel for electrolytic grinding was produced by repeating the procedure of Example 3 using as filler 55% by volume of graphite powder in place of the copper.

What is claimed is:

1. A method for making a grinding member having abrasive particles embedded in a substrate comprising a synthetic resin, the improvement which comprises the steps of:
   (1) placing a continuous layer of said resin on a base;
   (2) applying abrasive particles to an exposed surface of the resin layer; then,
   (3) while the resin is supported on the base and is in a partially hardened condition in which it is capable of being permanently deformed upon application of pressure thereto and is nonsticky, molding the resin layer to alter the shape of said resin layer by moving a rotating shaping roller over the exposed surface of the resin layer and applying a deforming pressure onto the surface of said resin layer by means of the roller for simultaneously
      (a) altering the shape of said resin layer until it has been deformed to a final profile and
      (b) embedding the abrasive particles into the exposed surface of said resin layer; and then (4) causing the resin to harden slowly without changing the shape of the surface and with substantially no volume change to form a grinding member having a grinding surface of said final profile.

2. A method as defined in claim 1, comprising the additional steps of mixing the resin with abrasive particles so that the particles become dispersed within the resin prior to placing the layer on the base, the abrasive particles dispersed within the resin being of coarser grain size than the abrasive particles applied to the exposed surface of the resin layer after it has been placed on the base.

3. A method according to claim 1, wherein the base comprises a central supporting disk and the continuous resin layer is of an annular configuration disposed around the rim of the disk.

4. A method according to claim 1, wherein the base comprises a central supporting disk and the continuous resin layer comprises an annular layer disposed around the rim of the disk with said exposed surface comprising the peripheral surface of the annular layer, and wherein the exposed surface of the layer is rolled to said final profile and said abrasive particles embedded into said exposed surface while said disk is mounted in its operable grinding position, whereby the grinding member is produced already mounted and trued up into position ready for use.

5. A method as defined in claim 1, comprising the additional step of mixing the resin with abrasive particles so that same can be dispersed within the resin prior to placing the resin layer on the base.

6. A method as defined in claim 1, comprising the additional step of mixing the resin with a filler so that the filler becomes dispersed within the resin prior to placing the resin layer on the base.

7. A method as defined in claim 6, wherein the resin contains comminuted metal in suspension therein.

8. A method according to claim 6, wherein the filler comprises at least one material selected from the group consisting of wood flour, chalk powder, marble flour, slate powder, silica flour, aluminum oxide, silica carbide, diamond dust, nylon, asbestos powder, mica powder and graphite.

9. A method as defined in claim 1, wherein the abrasive particles are sprayed onto the exterior surface of said layer.

10. A method as defined in claim 9, comprising the additional steps of providing a spray head at a constant distance from the exterior surface of the wheel for spraying the abrasive particles thereon, the constant distance between the spray head and the exterior surface of the wheel maintaining the concentration of abrasive particles applied to the exterior surface substantially constant, and spraying the abrasive particles onto the exterior surface for causing the abrasive particles to penetrate the exterior surface of the layer to a sufficient extent to cause the abrasive particles to become secured to the layer.

References Cited

UNITED STATES PATENTS

| | | | |
|---|---|---|---|
| 3,364,630 | 1/1968 | Rusk et al. | 51—298 |
| 3,415,635 | 12/1968 | Hallewell | 51—298 |
| 3,424,566 | 1/1969 | Kuenstle et al. | 51—293 |
| 3,436,874 | 4/1969 | Betzler | 51—293 |

DONALD J. ARNOLD, Primary Examiner

U.S. Cl. X.R.

51—298